May 16, 1967 R. R. SLEEPER, JR 3,319,953
CORNER PLASTER BEAD APPLICATOR
Filed Oct. 9, 1964 3 Sheets-Sheet 2
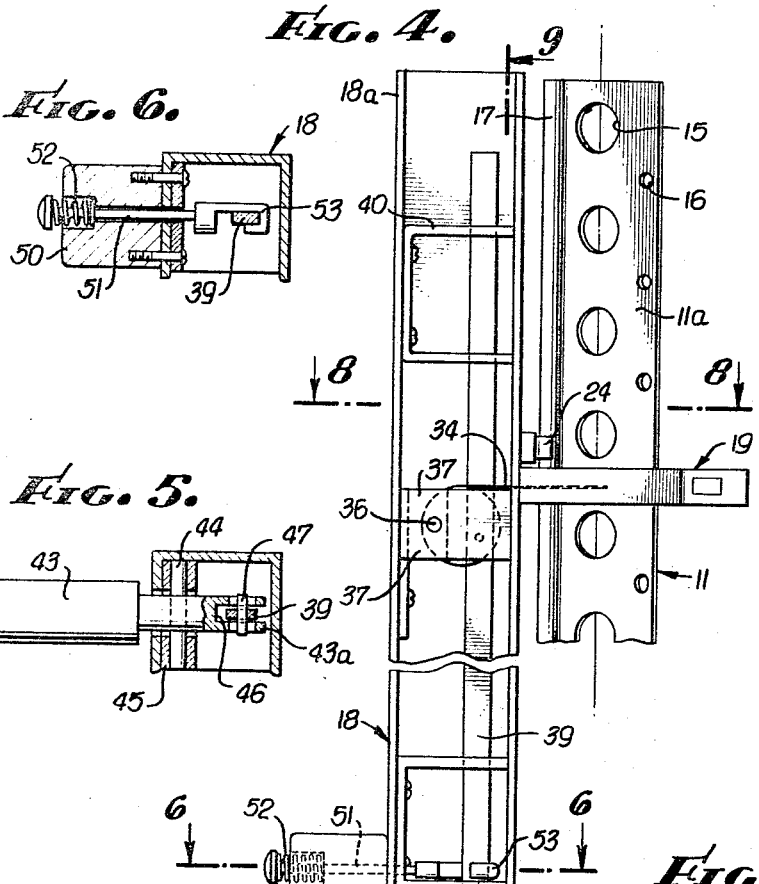
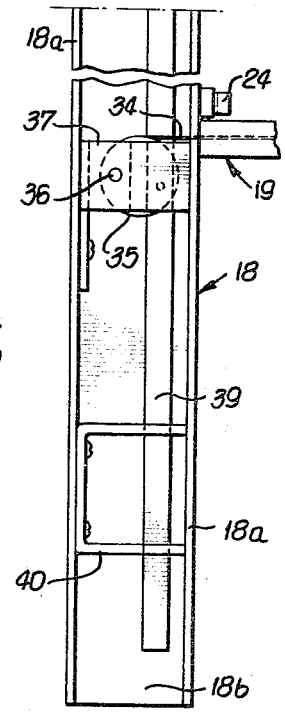
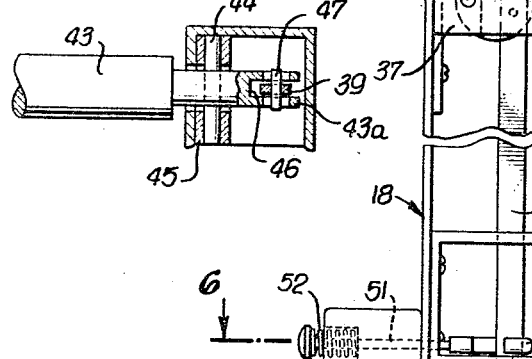
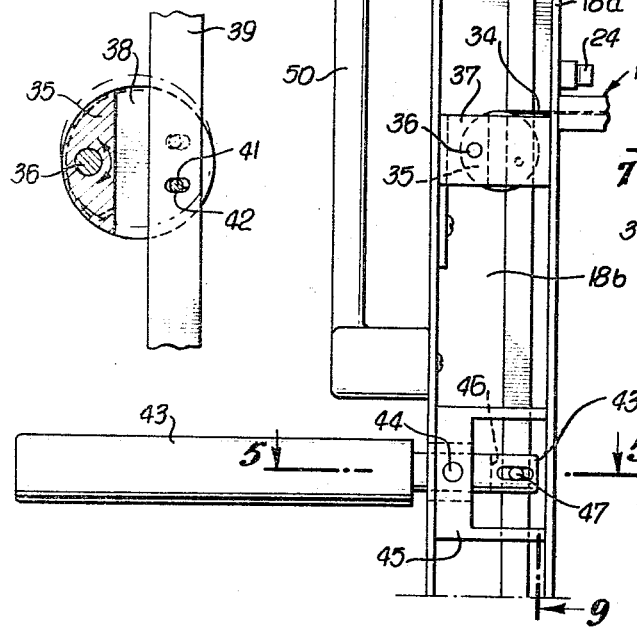
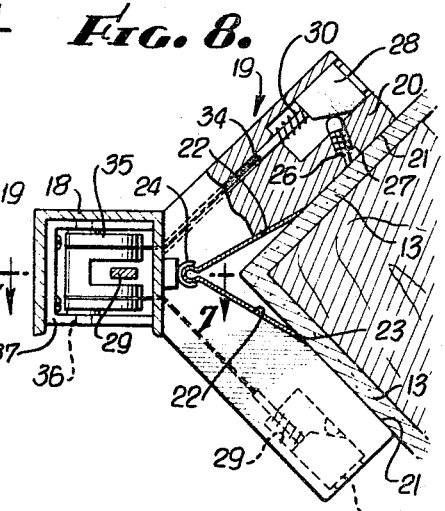
INVENTOR.
RALPH R. SLEEPER, JR.
BY
White & Haefliger
ATTORNEYS.

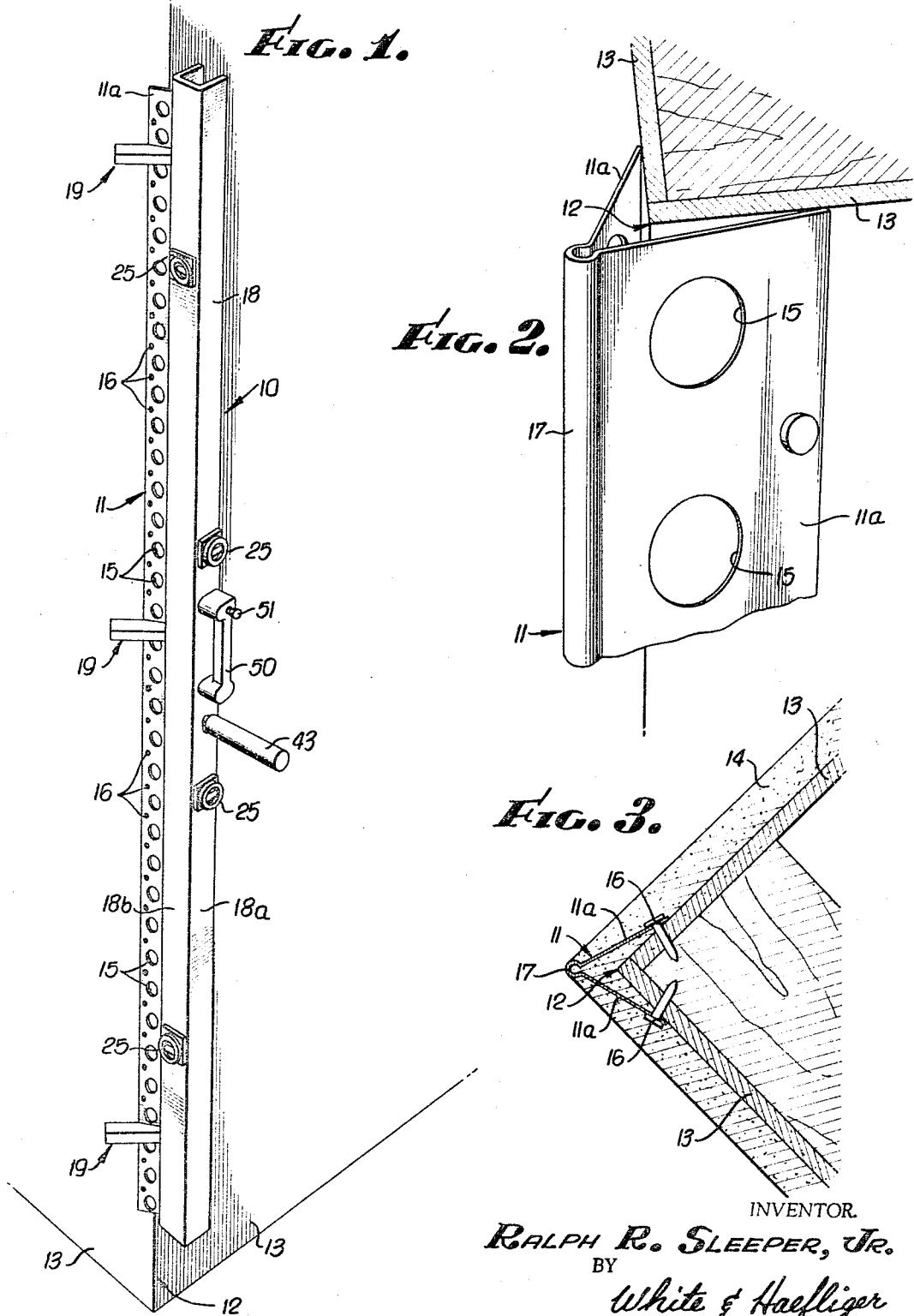

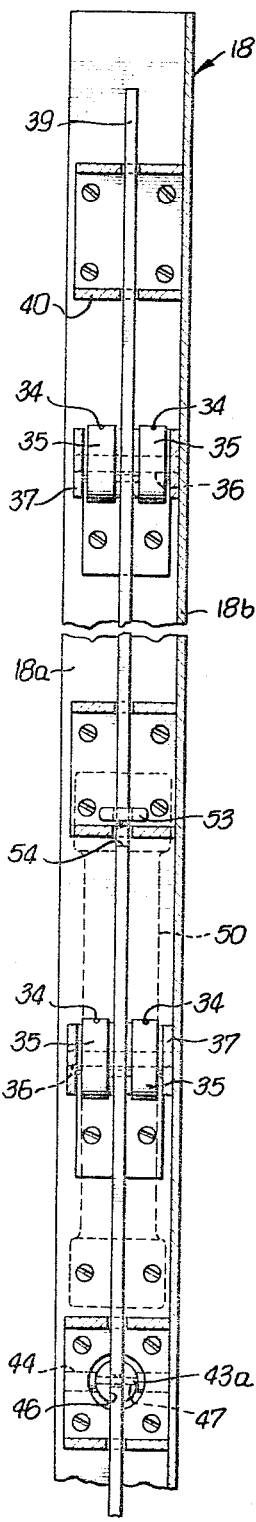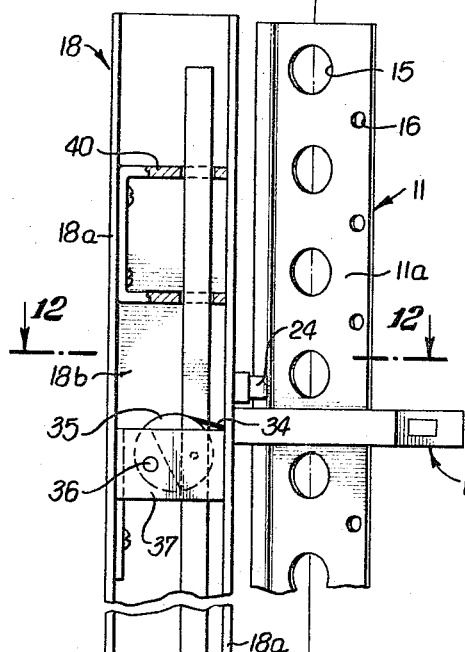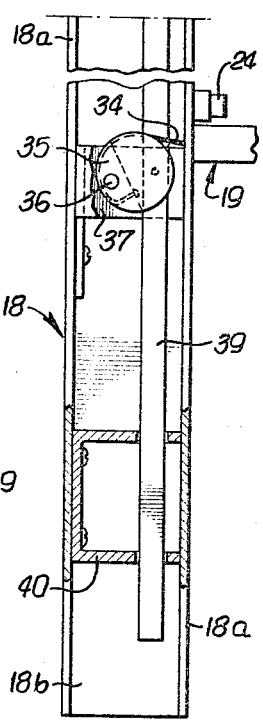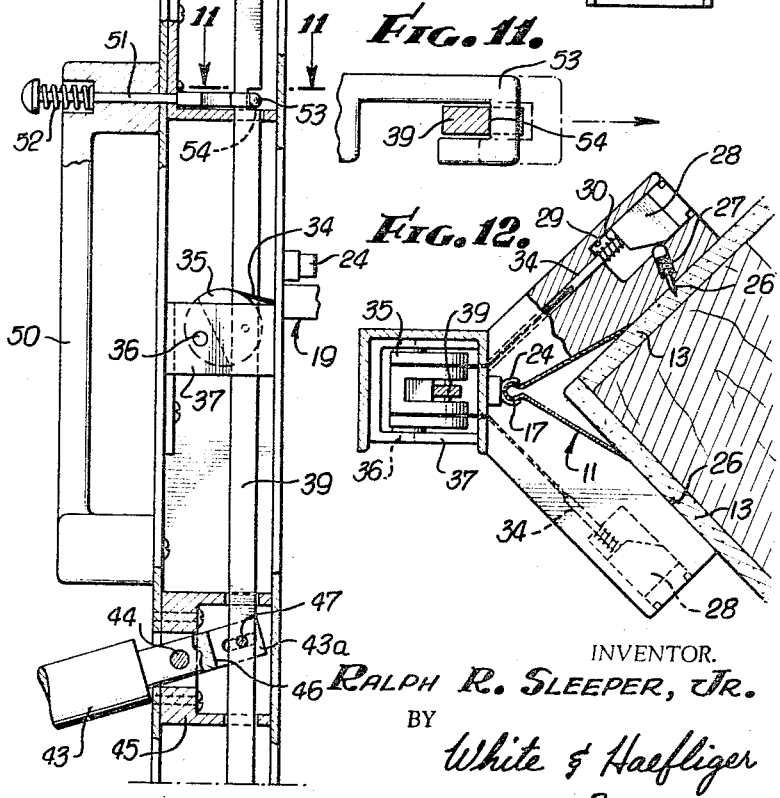

United States Patent Office 3,319,953
Patented May 16, 1967

3,319,953
CORNER PLASTER BEAD APPLICATOR
Ralph R. Sleeper, Jr., 1014 Chautaugua Blvd.,
Pacific Palisades, Calif. 90272
Filed Oct. 9, 1964, Ser. No. 402,728
12 Claims. (Cl. 269—19)

This invention has to do with the application of angular strips to outward corners of building walls prior to plastering, the function of such strips being to present exposed corner edges or beads protective of the plaster after its application to the wall surfaces and flange extents of the protective strips.

In themselves, such strips may be characterized as having flanges at less than 90 degree angularity, the flange edge portions being attachable, as by nailing, to the 90 degree corner surfaces of plaster board or the like. The juncture of the strip flanges presents an edge or bead which remains exposed after application of the plaster to the wall surfaces and at thickness embedding the flanges close to the protective edge or bead.

Heretofore the general practice has been to apply the strip to the wall corner, and by hand manipulation of the strip to endeavor to maintain it in proper alinement and placement upon the wall surfaces while the strip is being nailed in position throughout its length. Proper maintenance of the strip during installation requires considerable skill, and even for experienced workmen, the undertaking has many troublesome aspects and requires considerable time to accomplish a good job.

My general object is to obviate such difficulties by providing a novel applicator device capable of use even by inexperienced personnel to effect accurate placement of the strip and to maintain such placement during nailing of th strip flanges to the wall surfaces. In this connection, the invention contemplates an assemblage of the strip and applicator which is releasably attachable to the wall so that following initial placement a workman may proceed quickly and easily to make the installation free of any encumbrance by having to manipulate or hold the strip.

Structurally the invention contemplates an applicator in the nature of a releasably mountable jig or fixture comprising an elongated member or post which may approximate the length of the strip to be applied, and which carries at spaced locations, supports containing alined recesses to receive the strip and which may be conformed in angularity substantially to the normal strip configuration. As will be understood, the post length may vary according to the strip length for different places of installation as at floor-to-ceiling corners, and places of lesser length as along or about windows, doors and the like. Beyond the strip receiving recesses and the strip flanges, the supports are adapted to bear against the 90 degree wall surfaces and to carry means capable of releasably penetrating the wall surfaces to hold the assemblage in place. Typically, the supports may have jaw-like configurations suitable for having associated therewith movable elements capable of penetration into the wall surfaces.

The invention further contemplates such supporting and wall penetrating means where the latter are displaceable relative to or out of the support and are given simultaneous actuation. Thus, for this purpose, and as will later appear I provide for a common actuator such as a rod contained within the post and is so related to the wall penetrating elements that upon longitudinal shifting, the rod causes projecting actuation of the elements. Provision also is made for releasably locking the rod in its element projecting position so as to assure retention of the assembly in mounted condition during nailing of the strip.

The invention has various features, objects and details, all of which will be readily understood from the following detailed description of an illustrative embodiment shown by the accompanying drawings in which:

FIG. 1 is a perspective showing of a corner plaster strip positioned by the applicator for attachment to the wall surfaces;

FIG. 2 is a fragmentary perspective showing of the beaded strip in its relation to the wall corner;

FIG. 3 is a sectional view transversely of the strip showing how it is nailed to the wall or plasterboard and plastered over;

FIGS. 4 and 4a are continuing views showing the applicator in side elevation;

FIGS. 5 and 6 are cross sections respectively taken on lines 5—5 and 6—6 of FIG. 4;

FIG. 7 is a fragmentary section taken in the plane of line 7—7 of FIG. 8 illustrative of the relation between one of the post-contained reels and the actuating bar;

FIG. 8 is a cross section on line 8—8 of FIG. 4 showing the wall penetrating pins in retracted position;

FIG. 9 is a vertical section taken on line 9—9 of FIG. 4;

FIGS. 10 and 10a are views similar respectively to FIGS. 4 and 4a, showing the parts in changed positions;

FIG. 11 is a fragmetary enlarged section on line 11—11 of FIG. 10; and

FIG. 12 is a view similar to FIG. 8 and taken on line 12—12 of FIG. 10, showing the retaining pins thrust into the wall surfaces.

Referring first to FIGS. 1 to 3, the applicator generally indicated at 10 is employed for the position and retention in the manner later explained, of a conventional so-called corner plaster strip 11 to usually an inside building structure corner 12 formed for example by the right angular juncture of plaster lath 13 or other wall forms suitable for the application of a plaster coat 14, see FIG. 3. As previously indicated, the corner 12 may be a juncture definitive of a protruding room, door, window or other corner, and it will be understood that for any particular use the applicator 10 may be dimensioned, particularly longitudinally, for adaptation to any particular use or length. It will be understood that the strip 11 may have any of various known configurations, although it may be observed that generally they are formed of metal with flanges 11a at less than 90 degree angularity, e.g. approximating about 60 degrees, or substantially as illustrated, the flanges being provided with suitable openings 15 for passage-through of interlocking plaster, and with holes 16 towards the flange edges for nailing to the wall corner as shown in FIG. 3. Also ordinarily, the flange juncture is beaded at 17 to provide a rounded exposed edge protective of the plastered corner by exposure of the bead.

The applicator 10 comprises in the typical embodiment illustrated, a channel-shaped post 18 adapted to parallel the wall corner and carrying at vertically spaced intervals suitable supports or carriers, generally indicated at 19, for the wall penetrating elements. Referring particularly to FIGS. 8 and 12, the supports 19 are shown to comprise generally right angular or jaw shaped members 20 presenting at their inner faces, surfaces 21 in right angular relation to fit flatly against the surfaces of the plaster boards 13, and inwardly of surfaces 21, relatively acute angular surfaces 22 which may correspond substantially in angularity to the flanges of the strip 11. Thus in the applied condition of the supports with the strip 11 held between them, surfaces 21 accurately fit and engage against the wall surfaces and the strip is positioned in angular alignment with the wall corner with the flange edges accurately positioned at 23 for nailing to the wall surfaces. The outer surface of the post 18 may carry at suitable intervals, clips 24 to receive and releasably retain the beaded corner of the strip 11.

Optionally, the post 18 may carry on its faces 18a and 18b suitable level indicators 25 by means of which exactness in true verticality of the post may be determined.

Each of the members 20 contains a pair of pointed pins 26 normally thrust outwardly by coil springs 27 to their FIG. 8 position, the pins being directed inwardly and angularly, substantially as shown, to assure rigid holding of the members 20 to the wall surface when the pins are driven into the plasterboard as illustrated in FIG. 12. While capable of actuation by any of different mechanisms, the pins 26 typically are actuated by cams 28 slidable within recess 29 against the resistance of springs 30 about wires or small cables 34 which pass into the post 18 and are wound about small drums or reels 35 pivoted for swinging movement about pins 36 terminating in U-shaped mounting brackets 37. Referring to FIG. 7, each of the drums 35 is slotted at 38 to pass a common actuating rod 39 which is vertically shiftable within the post and terminally guided within brackets 40. As further illustrated in FIG. 7 each drum carries a pin 41 received within a slot 42 in the rod so as to provide a lost motion connection between the drum and rod whereby as the latter shifts vertically, the drums are rotated between the FIG. 4 and FIG. 10 positions.

The rod may be actuated in its shifting movement as by a handle 43 pivoted at 44 within bracket 45 inside the post, the inner end 43a of the handle being slotted at 46 to receive a pin 47 carried by the rod 39. Thus as the handle is rocked on its pivot 44 between the FIG. 4 and FIG. 10 positions, the rod 39 is correspondingly shifted upwardly to rotate the drums 35.

The post carries a suitable handle 50 within which may be accommodated a locking device for releasably holding the rod 39 in its upper or pin-projecting position. Thus the top of the handle is shown to contain a rod 51 normally urged outwardly by coil spring 52 and carrying on its inner end a locking terminal 53 engageable within a notch 54 in the rod 39. Thus when the latter is shifted upwardly to its FIG. 10 position, the locking terminal 53 snaps into notch 54 to hold the actuating rod in position until manually released by pushing inwardly the rod 51 against the resistance of spring 52.

In the operation of the device, the strip 11 first is positioned within the post by insertion into the clips 24. Then the assembly is applied to the structure corner 12 as shown in FIG. 1, with all the post mounted and contained parts in the condition illustrated in FIGS. 4 and 8. That is to say, the actuating rod 39 is in its downward position allowing for retraction of the pins 26. With the strip 11 properly engaged and aligned against the wall corner, rod 39 then is shifted upwardly to its locked condition of FIG. 10 so that as a result of the rod shift, drums 35 are rotated to pull cams 28 inwardly against the heads of the pins 26, thus driving them into the plasterboard 13 to a depth that will assure retention of the entire post and strip assembly in position without other support. The flanges of the bead strip then are nailed into the plasterboard as in FIG. 3, the lock 53 is then released and rod 39 shifted downwardly to allow retraction of the pins 26 from the plasterboard. The assembly is then removable, leaving the applied strip 11 to be plastered over with the protective bead 17 exposed as shown.

I claim:
1. Device for the application to building wall corners of an angular strip having flanges to be secured to the wall surfaces prior to plastering and presenting at the flange juncture a lineal bead for exposure at the wall corner from subsequently applied plaster overlying the flanges, comprising,
  (A) a portable post,
  (B) supports carried by the post at spaced intervals and containing alined recesses to receive the strip, and
  (C) means carried by said supports and movable relative thereto to releasably penetrate the wall surfaces beyond the flanges to mount the strip and post assembly to the wall surfaces while securing the strip flanges thereto.
2. Device according to claim 1, in which said means (C) comprises pin elements movable within openings in said supports to retractably penetrate the wall surfaces.
3. Device according to claim 2, comprising means for simultaneously actuating said elements.
4. Device according to claim 3, in which said actuating means comprises a rod shiftable longitudinally of the post to project said elements into the wall surfaces, and means for releasably locking said rod in its element projecting position.
5. Device according to claim 1, in which said supports comprise jaw-shaped members containing V-shaped recesses of less than 90 degree angularity to receive and conform to a corresponding strip angularity, and having beyond said recesses bearing surfaces related at 90 degree angularity for engagement against the wall surfaces.
6. Device according to claim 5, in which said penetrating means (C) are positioned at said bearing surfaces.
7. Device according to claim 5, comprising also means for releasably retaining the strip within said recesses.
8. Device according to claim 5, including also level indicating means carried by the post.
9. Device according to claim 5, in which said penetrating means (C), comprise elements movable within said jaw-shaped members and are projectable out of said bearing surfaces.
10. Device according to claim 9, including also means for simultaneously projecting said elements from the bearing surface of the supports and for releasably locking the elements in projected positions.
11. Device according to claim 10, in which the last mentioned means comprises a rod shiftable longitudinally within the post and operatively associated with said elements.
12. Device according to claim 11, comprising a rod actuating handle at the side of the post, and manually releasable locking means engageable with the rod to hold it in its element projecting position.

References Cited by the Examiner
UNITED STATES PATENTS 2,314,927  3/1943  Farrington _____ 269—58
3,123,352  3/1964  Mendola _____ 269—19

WILLIAM W. DYER, JR., *Primary Examiner.*

W. D. BRAY, *Assistant Examiner.*